US012277643B2

(12) United States Patent
Eker

(10) Patent No.: US 12,277,643 B2
(45) Date of Patent: Apr. 15, 2025

(54) VARIABLE BIT MORTON CODES

(71) Applicant: Advanced Micro Devices, Inc., Santa Clara, CA (US)

(72) Inventor: Ali Arda Eker, Bellevue, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 161 days.

(21) Appl. No.: 17/976,681

(22) Filed: Oct. 28, 2022

(65) Prior Publication Data

US 2024/0144581 A1     May 2, 2024

(51) Int. Cl.
*G06T 15/06* (2011.01)
*G06F 7/24* (2006.01)
*G06T 15/08* (2011.01)
*G06T 17/10* (2006.01)

(52) U.S. Cl.
CPC .............. *G06T 15/06* (2013.01); *G06F 7/24* (2013.01); *G06T 15/08* (2013.01); *G06T 17/10* (2013.01); *G06T 2210/12* (2013.01)

(58) Field of Classification Search
None
See application file for complete search history.

(56) References Cited

U.S. PATENT DOCUMENTS

2013/0033507 A1* 2/2013 Garanzha ............... G06T 15/06
345/522

OTHER PUBLICATIONS

Vinkler, M., et. al., "Extended Morton Codes for High Performance Bounding Volume Hierarchy Construction", HPG 17: Proceedings of High Performance Graphics, ACM, Jul. 2017, 8 pgs.
Baert, J., et. al., "Out-of-Core Construction of Spare Voxel Octrees", downloaded from: https://graphics.cs.kuleuven.be/publications/BLD13OCCSVO/BLD13OCCSVO_paper.pdf on Oct. 28, 2022, 6 pgs.

* cited by examiner

*Primary Examiner* — Nurun Flora
(74) *Attorney, Agent, or Firm* — Volpe Koenig

(57) ABSTRACT

A technique for performing ray tracing operations is provided. The technique includes determining a set of keys and a set of values corresponding to dimensions of a bounding box for a scene; sorting the set of keys and the set of values to generate a sorted set of values; and based on the sorted set of values, generating a Morton code for a triangle of the scene.

20 Claims, 9 Drawing Sheets

VARIABLE BIT MORTON CODES

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes determining a set of keys and a set of values corresponding to dimensions of a bounding box for a scene; sorting the set of keys and the set of values to generate a sorted set of values; and based on the sorted set of values, generating a Morton code for a triangle of the scene.

Figure 1:
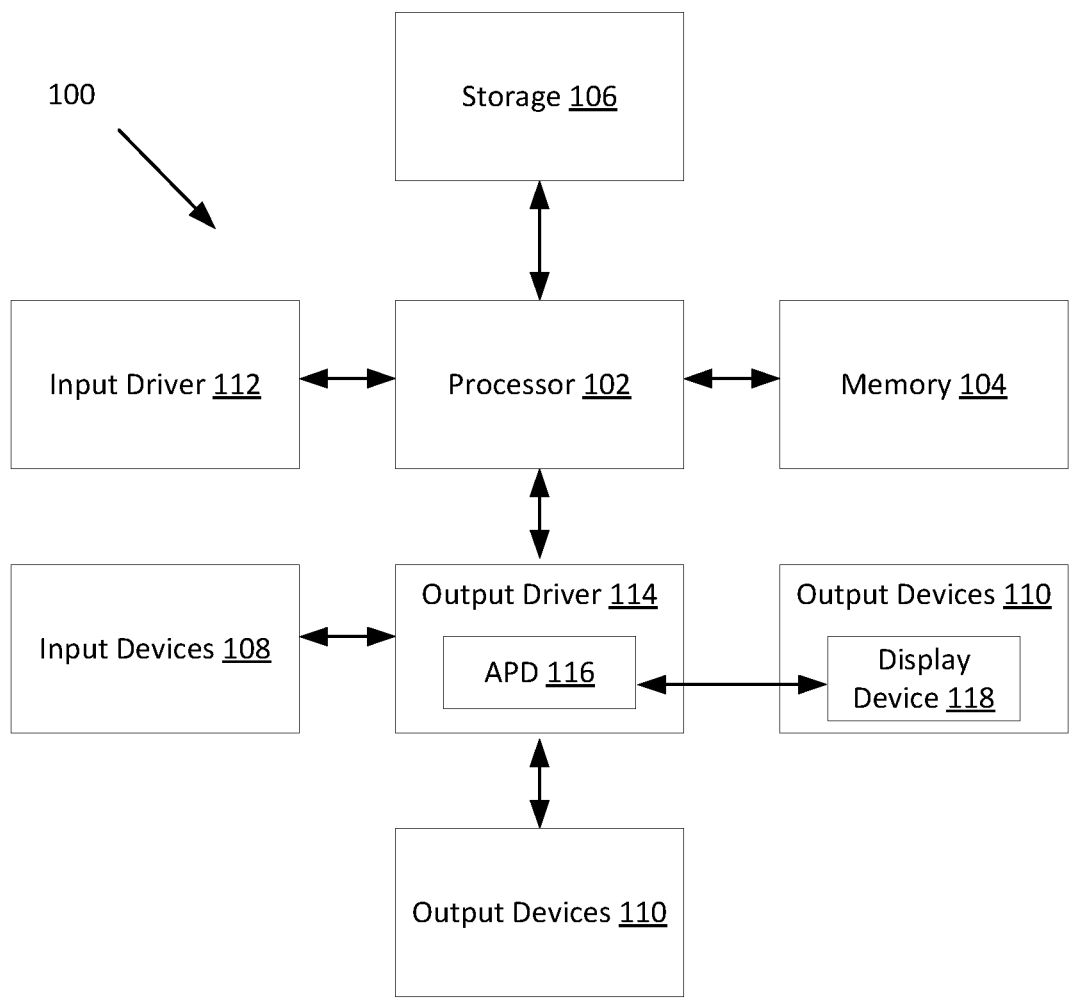
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
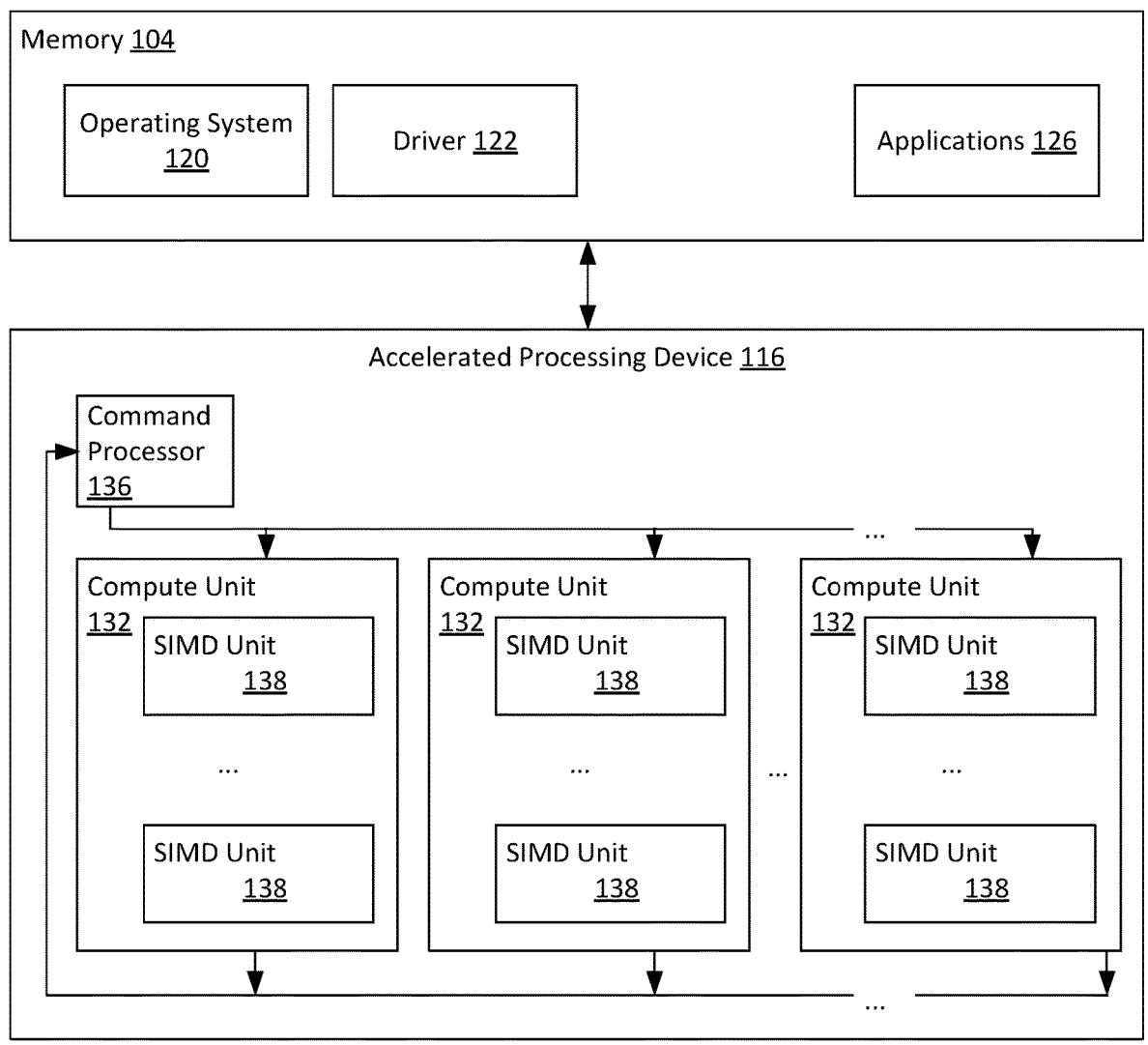
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes are to execute a given instruction. Predication can be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as a collection of work-items that can be executed simultaneously on a single SIMD unit 138, although it is possible for wavefronts to be divided into sets of work-items, each of which is executed simultaneously on a single SIMD unit 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
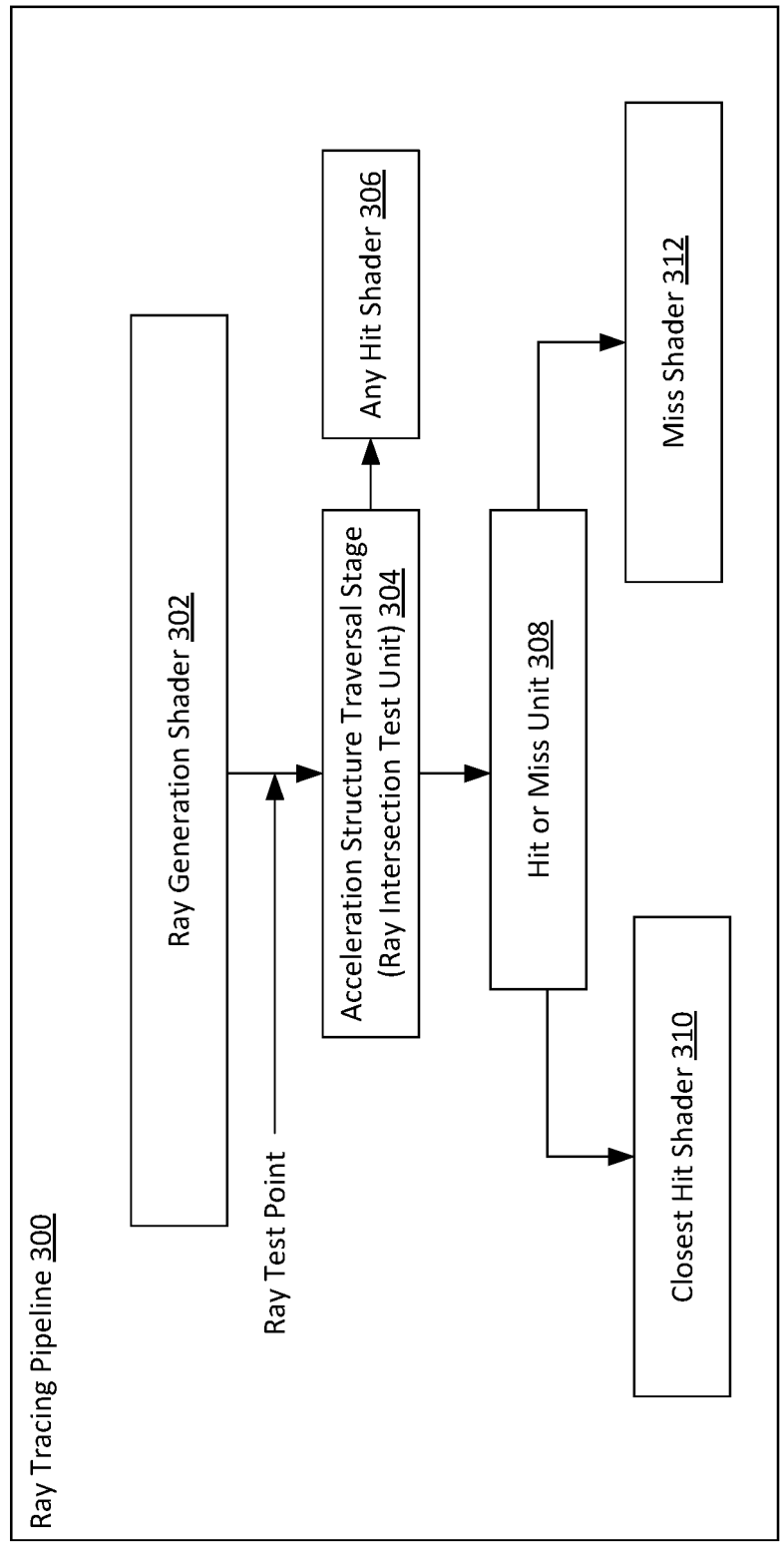
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. In some implementations, a ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). In other implementations, any of the ray generation shader 302, any hit shader 306, closest hit shader 310, and miss shader 312 are implemented as software executed on any type of processor and that performs the operations described herein, circuitry that performs the operations described herein, or a combination of hardware circuitry and software executing on a processor. The acceleration structure traversal stage 304 performs a ray intersection test to determine whether a ray hits a triangle.

The ray tracing pipeline 300 indicates the path through which a ray tracing operation flows. To render a scene using ray tracing, a rendering orchestrator, such as a program executing on the processor 102, designates a collection of geometry as a "scene." Various objects in the scene are represented as collections of geometry primitives, which are often triangles, but could be any geometric shape. The term "triangle" when used herein, refers to these geometric primitives that compose a scene. The rendering orchestrator renders the scene by designating a camera position and an image and requesting rays be traced from the camera through the image. The ray tracing pipeline 300 performs the various operations described herein to determine colors for the rays. The ray tracing pipeline 300 designates colors for the pixels of the image, based on the results of ray tracing operations for rays traced through the image. For example, a ray that hits a green triangle and passes through a particular screen position in the image is able to color the pixel corresponding to that screen position green.

Colors are often derived from the triangles that are intersected by the rays. As described elsewhere herein, a ray that hits no triangle invokes a miss shader 312. One possible operation for the miss shader 312 is to color the ray with a color from the "skybox," which is an image that is designated as representing the ambient scene where no geometry is present (for example, a scene with no geometry would render only the skybox). Colors for pixels in the image are determined based on the point of intersection between the ray and the image position. In some examples, after a sufficient number of rays are traced and the pixels of the image have been designated colors, the image is displayed on a screen or is used in some other manner.

In some implementation where the shader stages of the ray tracing pipeline 300 are implemented in software, the various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 is, in various implementations, orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [an action]" is used, this means that the hardware and/or software that implements the ray tracing pipeline 300 does that action. Although described as executing on the SIMD unit 138 of FIG. 3, it should be understood that in other implementations, other hardware, having or not having SIMD capabilities (e.g., the processor 102), alternatively executes the shader programs of the illustrated ray tracing pipeline 300.

The ray tracing pipeline 300 operates in the following manner. A ray generation shader 302 is executed. The ray generation shader 302 sets up data for a ray to test against triangles of a scene and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of the any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

It is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the closest hit shader 310 and miss shader 312 may implement a wide variety of techniques for coloring pixels and/or performing other operations. In instances in which these shaders are implemented as programmable shader stages executing shader programs, different shader programs used for the same application are capable of coloring pixels in different ways.

A typical way in which the ray generation shader 302 generates rays is with a technique referred to as backwards ray tracing. In backwards ray tracing, the ray generation shader 302 generates a ray having an origin at the point of the camera. The point at which the ray intersects a plane defined to correspond to the screen (the "image" above) defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In an example bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
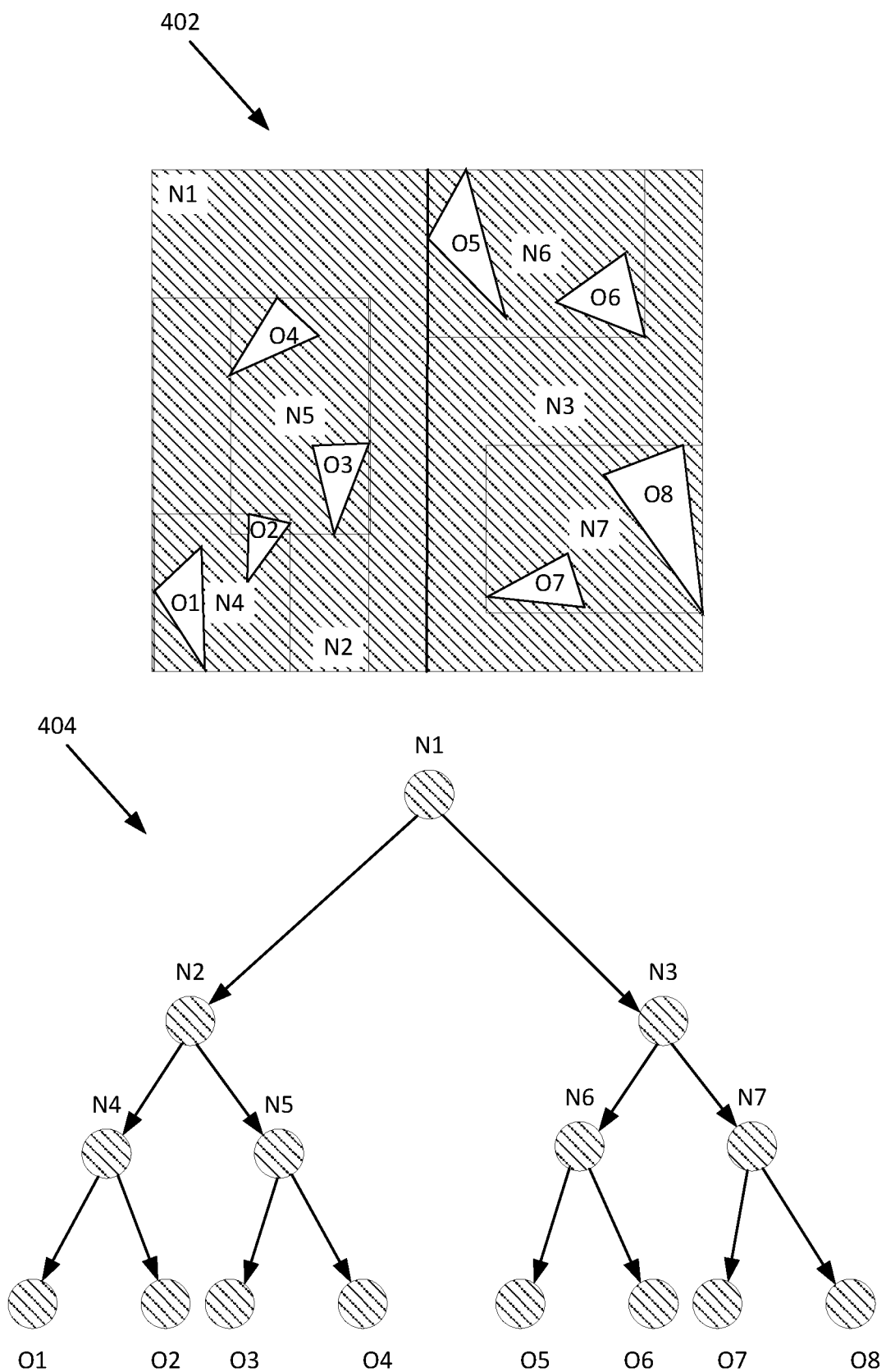
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node. For non-leaf nodes that are not eliminated, the ray intersection test would intersect the ray with such non-eliminated nodes, to determine whether children of such nodes should be eliminated from consideration. For leaf nodes or non-leaf nodes that are eliminated, the ray intersection test does not perform an intersection test of the ray with such nodes. In sum, to perform an intersection test for a ray, the ray racing pipeline 300 begins with one or more starting non-leaf nodes and tests one or more of those non-leaf nodes for intersection with the ray. The ray tracing pipeline 300 follows the edges of the bounding volume hierarchy, testing non-leaf nodes against the ray to either eliminate or not eliminate children of those nodes. For leaf nodes encountered by the ray tracing pipeline 300, the ray tracing pipeline 300 tests the ray against such nodes to determine whether the ray intersects the geometry associated with such leaf nodes.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

As described herein, non-leaf nodes are associated with bounding boxes that bound the geometry of the children of those non-leaf nodes. Leaf nodes are associated with geometry of the scene against which rays are tested. A variety of geometry types may exist. Some example geometry types for leaf nodes are triangles and procedural geometry, although this is not an exhaustive list. Procedural geometry is geometry whose intersection with a ray is defined procedurally, rather than as data. More specifically, procedural geometry is associated with leaf nodes, and represents the geometry that a ray is tested against to determine whether a ray hits the geometry of such leaf nodes. In the process of traversing a bounding volume hierarchy, in response to the ray tracing pipeline 300 encountering a leaf node that has associated procedural geometry, the ray tracing pipeline 300 triggers execution of a procedure, such as one specified in a shader program (or through other means), to determine whether the ray intersects that procedural geometry. Thus the test for intersection with a procedure is defined procedurally.

For ray tracing, it is often necessary to determine the relative position of the geometry in a scene. For example, a bounding volume hierarchy is constructed by grouping primitives into nodes based on the primitives' geometric locality in a scene. A coding scheme known as Morton codes are often utilized for this purpose. Morton codes map the three-dimensional coordinates of primitives to a one-dimensional value suitable for processing, while preserving the geometric locality of the primitives. Thus, when constructing a bounding volume hierarchy, sorting scene primitives based on Morton codes is a computationally efficient way to sort geometrically. A bounding volume hierarchy ("BVH") builder utilizing Morton codes can be included in the same system that performs ray tracing or in a different system, such as one that is used by an application developer to develop an application.

Figure 5:
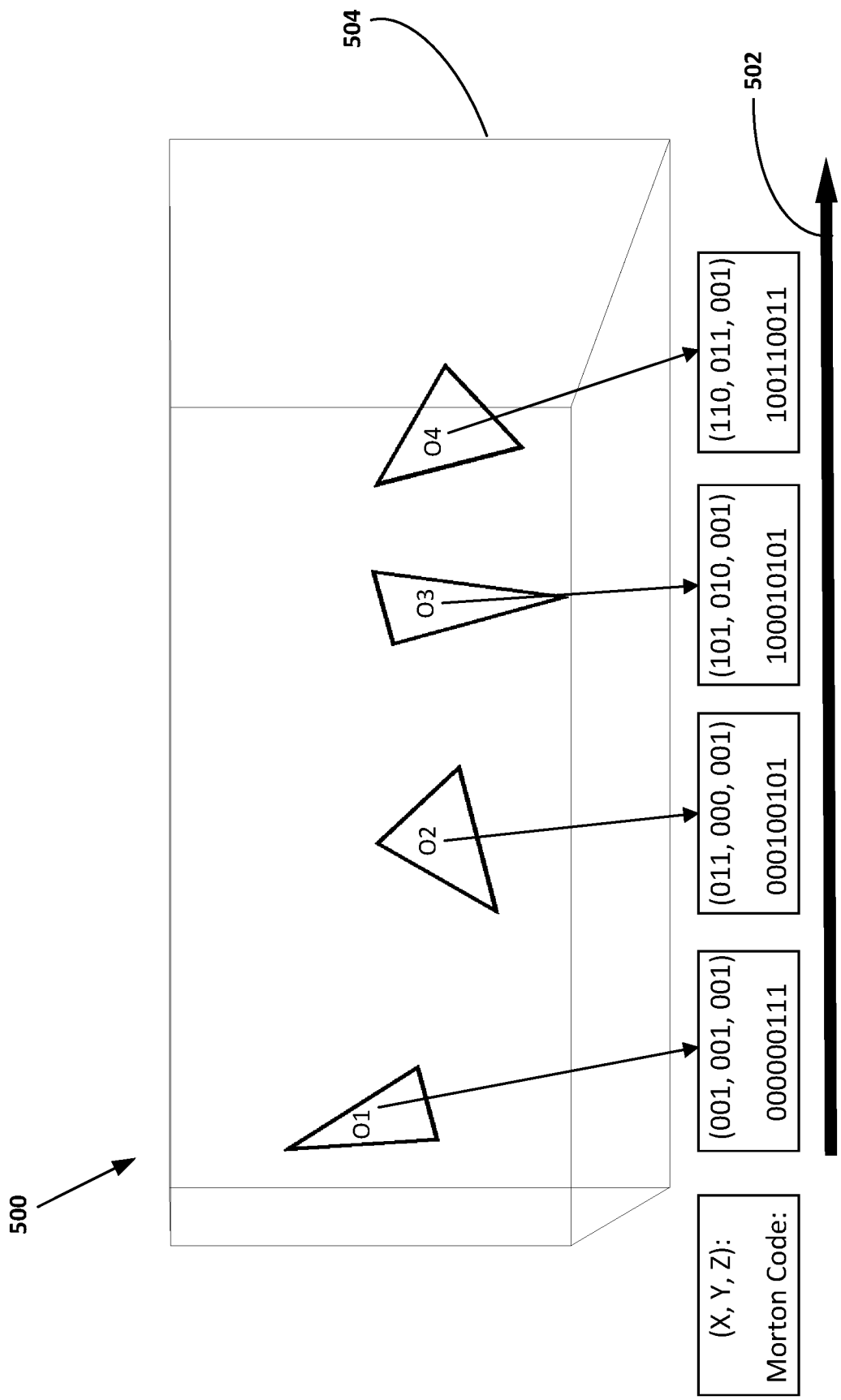
FIG. 5 illustrates an example scene.

FIG. 5 illustrates an example scene 500 depicting four primitives, the centroid coordinate values of those objects, and the associated Morton code for each object's centroid coordinate. Each primitive is marked with a name O1 to O4, and arrows are illustrated for each primitive pointing to data indicating the three-dimensional coordinates of the centroids and the corresponding Morton codes.

Computing the Morton code of a coordinate is performed by interleaving the bits of the coordinate binary values. In an example calculation, the most significant bit of the calculated Morton code is the most significant bit of X coordinate value, the second most significant bit of the Morton code is the most significant bit of the Y coordinate value, and the third most significant bit of the Morton code is the most significant bit of the Z coordinate value. Continuing this pattern for the next most significant bits of each coordinate value would result in a fully computed Morton code, encoding multi-dimensional information into a single value. In some examples, Morton codes utilize a fixed number of bits for each coordinate dimension, but can vary in total bit size based on a variety of factors.

A notable property of Morton codes is that the magnitude of the code value rising represents moving along a curve in the scene. In the example shown in FIG. 5, the Morton code values increase along the directional indicator 502 because the X coordinate values are increasing, illustrating how representing coordinates as Morton codes allows for a simple yet efficient way to sort coordinates geometrically.

In some cases, such as the example scene 500, a particular scene dimension may be significantly larger than the other two dimensions. That is, the bounding box 504 that tightly bounds all of the geometry in a scene can have one dimension (or two) that is significantly larger than the other dimension or dimensions of that bounding box. In these scenarios, Morton codes having an equal number of bits for each dimension can be inefficient and result in an inappropriate allocation of bit depth when compared to the level of detail required for each coordinate dimension. In such a situation, it would be useful to utilize a variable bit Morton code to account for the deficiencies of a static bitlength. Thus, Morton codes with a variable number of bits per dimensions, and techniques for generating and using such Morton codes, are provided herein.

It should be understood that Morton codes can be shorter than the total number of bits within the coordinate values from which the Morton codes are derived.

It should be understood that FIG. 5 represents a simplified example of Morton codes for illustrative purposes. For example, while a simple, one directional sorting direction 502 is illustrated, it should be understood that the geometric direction in which Morton codes are sorted is complicated and can follow a non-straight path.

Figure 6:
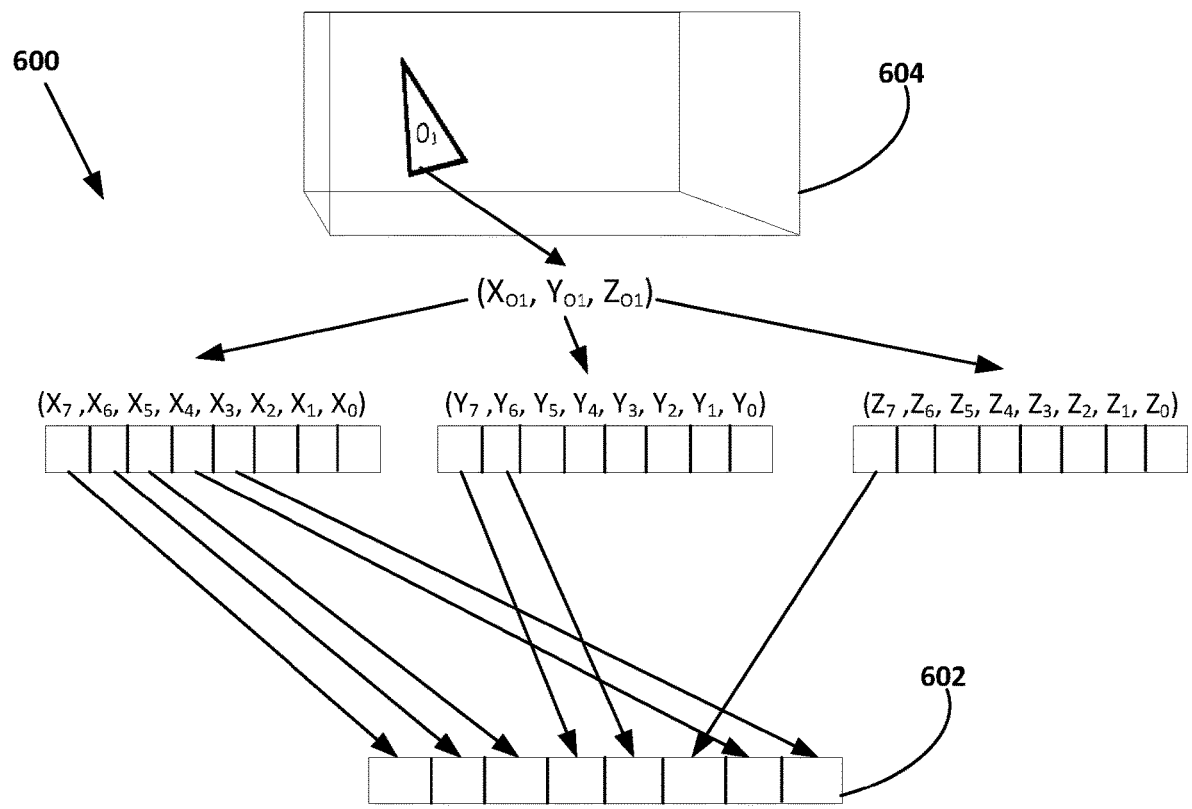
FIG. 6 portrays a variable bitlength Morton code and its derivation from an object within a scene, according to an example.

FIG. 6 portrays scene information 600 including a variable bitlength Morton code 602 and its derivation from an object O1 within a scene, according to an example. The centroid of the object O1 is shown as the coordinates ($X_{O1}$, $Y_{O1}$, $Z_{O1}$). A centroid is a coordinate characterizing an object. In one example, for a triangle, the centroid is the intersection point of the medians of the triangle.

When constructing a variable bitlength Morton code, in contrast to a traditional Morton code, the number of bits taken from each dimensional coordinate into the Morton code is not static. Determining how many bits of each dimension is utilized is the foundation for constructing a variable bitlength Morton code. As shown in FIG. 5, the example variable bitlength Morton code 602 comprises 5 bits from the X dimension, 2 bits from the Y dimension, and 1 bit from the Z dimension.

In one embodiment, the number of bits utilized from each dimension is based upon the scene dimensional extremes. In some examples, the number of bits utilized for a particular dimension is proportional to the ratio of the size of that dimension of the scene dimensional extremes compared to the sum of the sizes of each dimension scene dimensional extremes. Put differently, in these examples, the number of bits assigned to a particular dimension is equal to the size of the bounding box 604 in that dimension divided by the sum of the sizes of each dimension of the bounding box 604. In the example of FIG. 6, the bounding box 604 is 100 units in X, 40 units in y, and 20 in z, and the Morton code 602 is 8 bits. Thus, in this example, the x direction is afforded 5 bits, the y direction is afforded 2 bits, and the z direction is afforded 1 bit.

FIG. 6 further depicts the interleaving of coordinate bits to construct the variable bitlength Morton code 602. After the number of bits being utilized from each dimension is determined, this bit interleaving process is undergone, resulting in a computed variable bitlength Morton code 602. The bits of the Morton code can be interleaved in any technically feasible manner. In one example, a Morton code is formed from multiple sets of interleaved bits. Each set of interleaved bits includes bits from each dimension. The number of bits for each coordinate in a set of interleaved bits is proportional to the ratio of the size of the bounding box 604 in that coordinate to the sum of the sizes of the bounding box 604 in each coordinate. In the example above, where the x size of the bounding box 604 is 100, the y size is 40, and the z size is 20, a set includes 5 bits from the x coordinate, 2 bits from the y coordinate, and 1 bit from the z coordinate. The bits for any particular dimension within the Morton code are ordered from most significant to least significant, and interleaved in that manner. For example, a first set includes the five most significant bits from the x coordinate, the two most significant bits from the y coordinate, the one most significant bit from the z coordinate, and then the next five most significant bits from the x coordinate, the next two most significant bits from the y coordinate, the next one most significant bit from the z coordinate, and so on. Although a particular manner for interleaving bits to generate a Morton code is described, any technically feasible manner for interleaving bits is possible. The techniques defined herein are directed to determining how many bits from each dimension of the coordinates are to be used to form the Morton code.

The various numerical aspects depicted in FIG. 6, such as the particular sequence in which the coordinate bits are interleaved, the number of bits per coordinate, and the number of bits in the Morton code, are exemplary and should not be taken as limiting.

Figure 7:
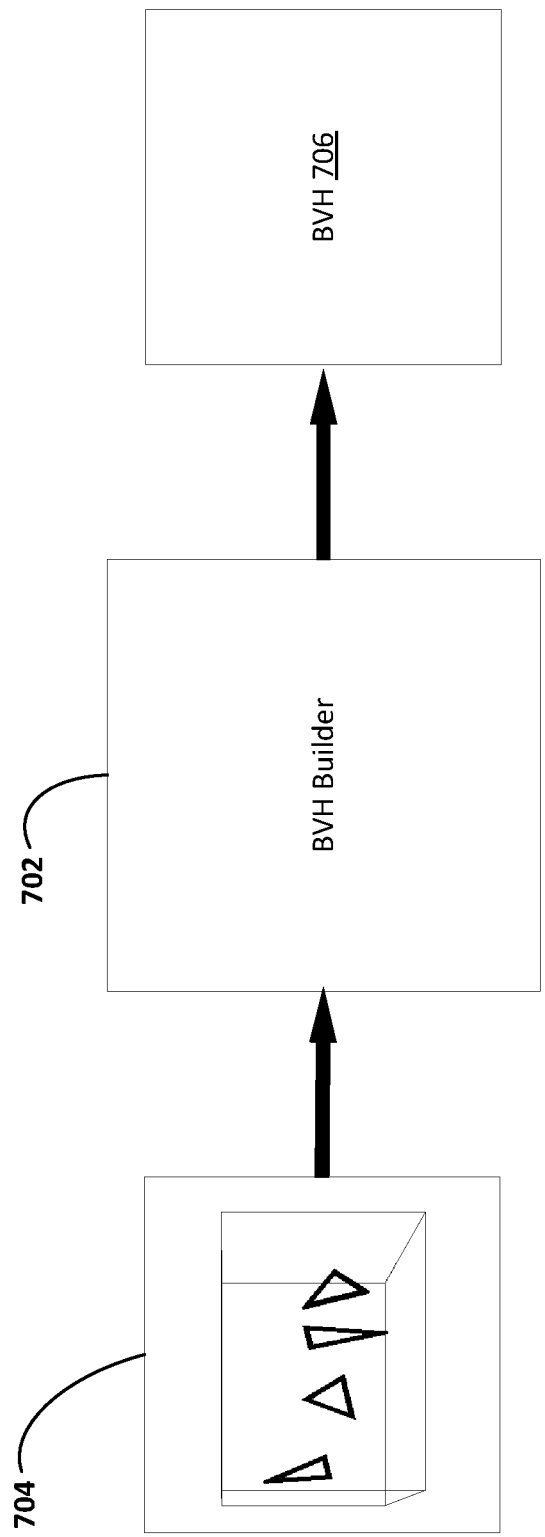
FIG. 7 is a system diagram illustrating a bounding volume hierarchy builder that utilizes variable bitlength Morton codes, according to an example.

FIG. 7 is a system diagram illustrating a bounding volume hierarchy builder 702 that utilizes variable bitlength Morton codes, according to an example. The BVH builder 702 accepts, as input, scene geometry 704, generates a BVH, and outputs the BVH 706. During the process of generating the BVH 706, the BVH builder 702 may utilize Morton codes constructed from the inputted scene geometry 704 to geometrically sort objects in an efficient manner. In some situations, such as if the scene possesses varied dimension extremes, variable bitlength Morton codes are more accurate and efficient for ray tracing applications than Morton codes with equal numbers of bits for each dimension. In these scenarios, the BVH builder 702 may perform the variable bit Morton code construction depicted in FIG. 6 for associated scene geometry 704. Following the construction of the variable bitlength Morton codes, the BVH builder 702 sorts the scene objects geometrically utilizing the constructed Morton codes to generate a sorted set of geometry. The BVH builder 702 can be implemented in hardware, software, or a combination thereof, and can be included in the system of FIG. 1 or in a different system.

Figure 8:
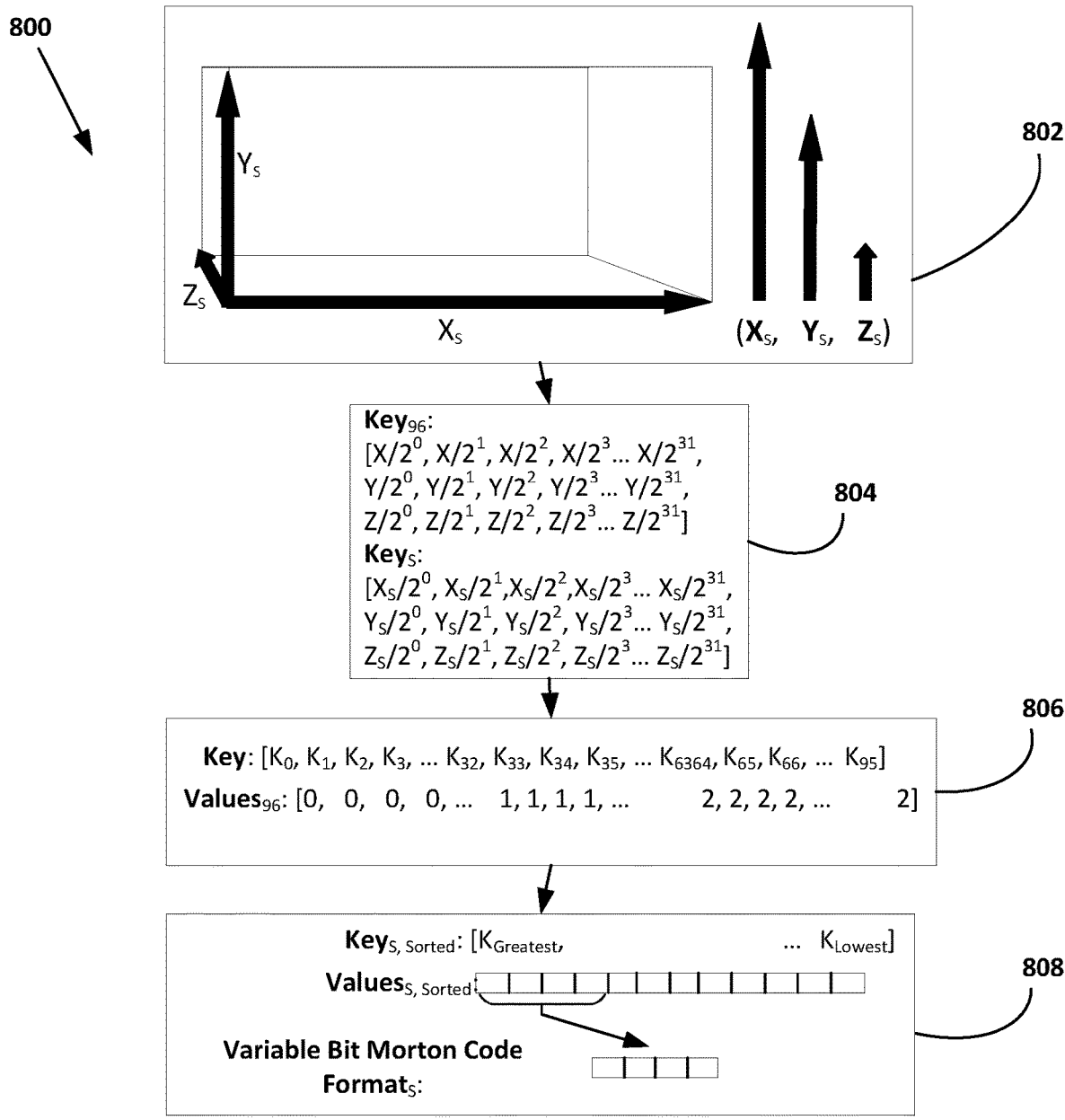
FIG. 8 depicts an example technique for determining the number of bits to afford to each dimension of a Morton code.

FIG. 8 depicts an example technique for determining the number of bits to afford to each dimension of a Morton code. As shown in FIG. 8, a BVH builder utilizes the dimensional magnitudes 802 of the inputted scene 704 to compute the format for variable bitlength Morton code construction. The "dimensional magnitudes" means the size of the tightly fitting bounding box for the geometry of the scene, in each dimension. In FIG. 8, the dimensional magnitude values are shown as ($X_S$, $Y_S$, $Z_S$).

Utilizing the dimensional magnitude values ($X_S$, $Y_S$, $Z_S$), a BVH builder 702 computes a list of key values 804. In the embodiment shown, $Key_{96}$ represents a generic list, and Keys represents the key list as computed for the inputted scene 802. In the embodiment shown, the key list computed by the BVH builder 702 contains 96 computed values. The Key list may be computed as shown in FIG. 8, wherein the dimensional magnitudes ($X_S$, $Y_S$, $Z_S$) are divided by increasing exponents of 2 a total of 32 times respectively, such that the Key list begins with $X_S/2^0$ and ends with $Z_S/2^{31}$. The division process is performed for each dimension, which results in a list containing 96 items. In some examples, this division occurs in parallel, for example in the SIMD units 138 of FIG. 2, at the direction of a shader program, with each lane dividing an input value (one of the dimensional magnitudes) by a different exponent of 2, such that the parallel division results in a set of keys including each dimensional magnitude divided by a set of increasing exponents of 2 (e.g., x, y, and z dimensional magnitudes divided by the range of exponents of 2 from $2^0$ to $2^{31}$).

In addition to generating the Key list 804, the BVH builder 702 creates a list representing the dimensional indices of the same size as the key, shown as Values. A dimensional index is a value that represents a particular dimension. In an example, 0 represents x, 1 represents y, and 2 represents z. Although specific dimensional indices are described, any dimensional index could alternatively be utilized. The Values list contains the same number of total items as the Key list, and the indices contained in the Values list corresponds to a particular dimension. For example, FIG. 8 shows a Key list containing 96 items, 32 utilizing each dimension, and the Values list shown also comprises 96 items, with 32 indices for each dimension. In the embodiment shown, the number 0 represents the X direction, the number 1 represents the Y direction, and 2 represents the Z direction. Each item of the Values list representing a particular dimension corresponds to an item of the Key list, such that the BVH builder 702 retains knowledge of the dimensional direction from which the computed Key list item originated from. In sum, the Key list includes the keys as described above. For each key, the Values list includes a corresponding value, which is the index of the dimension from which the corresponding Key is generated. In an example, if the Keys list includes 32 keys from the x dimension, then 32 keys from the y dimension, then 32 keys from the z dimension, then the values list includes 32 x indices, then 32 y indices, then 32 z indices.

In the next step of computing a variable bitlength Morton code format, the BVH builder 702 sorts the Key list from largest to smallest by magnitude 806. In one embodiment, this sorting can be performed utilizing a fast, LDS-based GPU sorting method such as Odd Even Merge Sort. Sorting the Key list also results in a sorted Values list. The Values list is sorted via the corresponding items contained in the Key list, such that the position of the dimensional indices within the sorted Values list continues to correspond to corresponding item within the sorted Key list. This sorting process results in two lists 806, the Key list and the Values list, that have been sorted in an identical manner. In other words, in the values list, the indices are placed in the same order as the corresponding items in the keys list.

Following the above sorting process, the BVH builder 702 constructs the appropriate variable bitlength Morton code format for the inputted scene 704 in 808. As described above, the sorted Values list represents an ordering of scene dimensions based upon the ordering of the corresponding Key list items of those scene dimensions. Because the sorted Key list items are ordered based upon the magnitudes of the scene dimensions, the indices contained within the sorted Values list can be thought of as an ordering of the dimensional directions based upon the size and proportion of that dimension to the scene as a whole. As such, the sorted Values list can be utilized as the format for a variable bitlength Morton code.

The BVH builder 702 utilizes the sorted Values to determine the order in which bits should be interleaved to construct the appropriate variable bitlength Morton code, as in FIG. 6. In an example, if the first items of the computed variable bit Morton code format are [0, 0, 1 . . . ], the BVH builder 702 has determined that the first 3 interleaved bits would from the [X, X, Y . . . ] dimensions, pulling from the most significant bit of the coordinate value as needed. In the implementation shown in FIG. 8, the sorted Values list contains 96 indices, and the first 32 bits are used to determine the construction format of variable bitlength Morton codes, resulting in a 32-bit variable bitlength Morton code. The bit-size of the variable bitlength Morton code format can vary, and the same method applies to differently sized Morton codes as well, such as a 64-bit variable bitlength Morton code.

For ray tracing, utilizing variable bitlength Morton codes and computing the codes via this method provides many advantages. In the context of a BVH builder 702, the embodiment of the process 800 allows the BVH builder 702 to efficiently construct a BVH 706 based upon the inputted scene geometry 704. Such that the BVH tree 706 is more adapted to the scene dimensions than if a traditional Morton code had been used.

Figure 9:
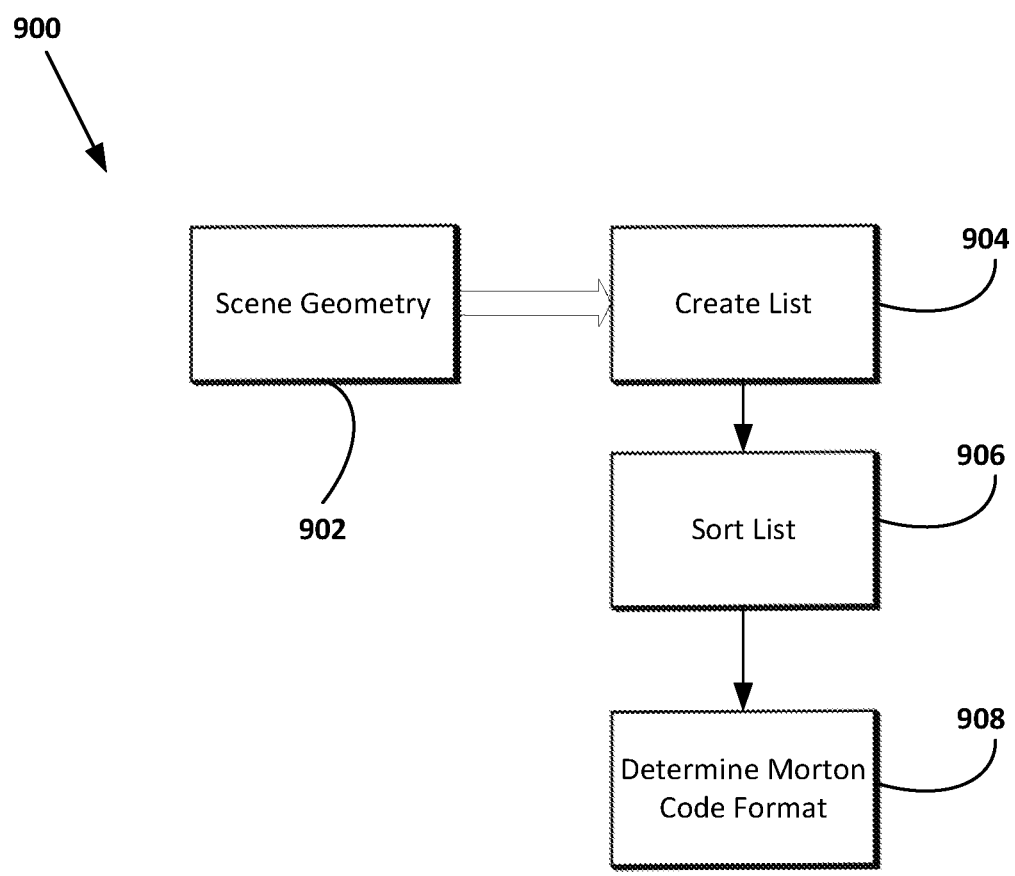
FIG. 9 illustrates an example method for creating a variable bitrate Morton code.

FIG. 9 illustrates an example method 900 for creating a variable bitrate Morton code. Although described with respect to the system of FIGS. 1-8, those of skill in the art will understand that any system configured to perform the operations of the method 900 in any technically feasible order falls within the scope of the present disclosure.

At step 904, the BVH builder accepts an input of system geometry 902, for which a BVH tree will be built. Using this geometry, the BVH builder computes the Key list and the Values list 904 indices associated with each of the Key list items, as described in FIG. 7. At step 906, the BVH builder sorts the Key list based upon the magnitude of each item contained in the list. Additionally, the Values list indices are sorted based upon the sorting of the Key list. The sorting may be performed using a method known in the art, as further described in FIG. 7. At step 908, the BVH builder uses the sorted values list to determine the format of the variable bit Morton code. In this embodiment, the sorted Values list is utilized to determine the order for which bits should be interleaved to construct the appropriate variable bitlength Morton code, as described in FIGS. 6 and 7.

As stated, the BVH builder 702 utilizes the Morton codes to build a BVH based on scene geometry. In an example, the BVH builder 702 generates Morton codes for the primitives of a scene and sorts the Morton codes numerically. The result is a sorted list of geometry whose closeness in the sorted list is associated with geometric closeness. The BVH builder 702 generates the BVH by grouping geometry that is close together to form box nodes, grouping those box nodes together to form box nodes higher in the BVH hierarchy, and so on.

Each of the units illustrated in the figures represent hardware circuitry configured to perform the operations described herein, software configured to perform the operations described herein, or a combination of software and hardware configured to perform the steps described herein. For example, the acceleration structure traversal stage 304 is implemented fully in hardware, fully in software executing on processing units (such as compute units 132 of the collection of compute units 202), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. In addition, any of the stages of the ray tracing pipeline 300 are, in various implementations, implemented as hardware circuitry, software executing on a processor, or a combination thereof. In addition, any of the units of FIG. 1 or 2 are, in various implementations, implemented as hardware circuitry, software executing on a processor, or a combination thereof. Where a particular stage of the ray tracing pipeline 300 is said to be "invoked," this invocation involves performing the functionality of the hardware if the stage is implemented as hardware circuitry or executing a shader program (or other software) if the stage is implemented as a shader program that executes on a processor. The illustrated elements of the APD 116 in FIG. 2 (e.g., the scheduler 136, graphics processing pipeline 134, compute units 132, and SIMD units 138) represent hardware elements such as hardware circuitry. The BVH builder 702 is implemented as hardware, software, or a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising
   determining a set of keys and a set of values corresponding to dimensions of a bounding box for a scene, wherein the set of keys includes a decreasing numerical sequence beginning at an extent of the bounding box in a first axis;
   sorting the set of keys and the set of values to generate a sorted set of values; and
   based on the sorted set of values, generating a Morton code for a triangle of the scene.

2. The method of claim 1, wherein the set of keys includes geometric extents of the scene divided by increasing exponents of two.

3. The method of claim 1, wherein the set of values includes dimension indices for the dimensions of the scene.

4. The method of claim 1, wherein sorting the set of keys includes sorting the keys numerically.

5. The method of claim 4, wherein sorting the set of values includes ordering the values in a corresponding order to the sorted set of keys.

6. The method of claim 1, wherein generating the Morton code based on the sorted set of values comprises drawing bits from axes of a coordinate of the triangle based on the order of the sorted set of values.

7. The method of claim 1, wherein the Morton code includes an interleaved set of bits from the axes of a coordinate of the triangle.

8. The method of claim 1, further comprising generating a bounding volume hierarchy based on Morton codes of triangles of the scene.

9. The method of claim 1, wherein the bounding box comprises a box that tightly fits geometry of the scene.

10. A system configured to perform ray tracing operations, the system including:
    a memory configured to store scene data; and
    a processor configured to perform operations for a bounding volume hierarchy builder, the operations including:
       determining a set of keys and a set of values corresponding to dimensions of a bounding box for a scene of the scene data, wherein the set of keys includes a decreasing numerical sequence beginning at an extent of the bounding box in a first axis;
       sorting the set of keys and the set of values to generate a sorted set of values; and
       based on the sorted set of values, generating a Morton code for a triangle of the scene.

11. The system of claim 10, wherein the set of keys includes geometric extents of the scene divided by increasing exponents of two.

12. The system of claim 10, wherein the set of values includes dimension indices for the dimensions of the scene.

13. The system of claim 10, wherein sorting the set of keys includes sorting the keys numerically.

14. The system of claim 13, wherein sorting the set of values includes ordering the values in a corresponding order to the sorted set of keys.

15. The system of claim 10, wherein generating the Morton code based on the sorted set of values comprises drawing bits from axes of a coordinate of the triangle based on the order of the sorted set of values.

16. The system of claim 10, wherein the Morton code includes an interleaved set of bits from the axes of a coordinate of the triangle.

17. The system of claim 10, wherein the operations further include generating a bounding volume hierarchy based on Morton codes of triangles of the scene.

18. The system of claim 10, wherein the bounding box comprises a box that tightly fits geometry of the scene.

19. A non-transitory computer-readable medium storing instructions that, when executed by a processor, cause the processor to perform ray tracing operations, the ray tracing operations including:
    determining a set of keys and a set of values corresponding to dimensions of a bounding box for a scene, wherein the set of keys includes a decreasing numerical sequence beginning at an extent of the bounding box in a first axis;

sorting the set of keys and the set of values to generate a sorted set of values; and based on the sorted set of values, generating a Morton code for a triangle of the scene.

20. The non-transitory computer-readable medium of claim 19, wherein the set of keys includes geometric extents of the scene divided by increasing exponents of two.

\* \* \* \* \*